(12) United States Patent
Matsumoto

(10) Patent No.: US 12,090,632 B2
(45) Date of Patent: Sep. 17, 2024

(54) ROBOT ARM MECHANISM

(71) Applicant: FANUC CORPORATION, Yamanashi (JP)

(72) Inventor: Kuniyasu Matsumoto, Yamanashi (JP)

(73) Assignee: FANUC CORPORATION, Yamanishi (JP)

( * ) Notice: Subject to any disclaimer, the term of this patent is extended or adjusted under 35 U.S.C. 154(b) by 238 days.

(21) Appl. No.: 17/794,536

(22) PCT Filed: Feb. 15, 2021

(86) PCT No.: PCT/JP2021/005450
§ 371 (c)(1),
(2) Date: Jul. 21, 2022

(87) PCT Pub. No.: WO2021/166831
PCT Pub. Date: Aug. 26, 2021

(65) Prior Publication Data
US 2023/0079034 A1    Mar. 16, 2023

(30) Foreign Application Priority Data

Feb. 19, 2020   (JP) ................. 2020-026056

(51) Int. Cl.
*B25J 19/02*    (2006.01)
*B25J 9/06*     (2006.01)
(Continued)

(52) U.S. Cl.
CPC .............. *B25J 13/085* (2013.01); *B25J 9/06* (2013.01); *B25J 9/1633* (2013.01); *B25J 19/02* (2013.01); *B25J 19/06* (2013.01)

(58) Field of Classification Search
CPC . B25J 9/06; B25J 9/1633; B25J 13/085; B25J 19/02; B25J 19/06
See application file for complete search history.

(56) References Cited

U.S. PATENT DOCUMENTS

| 10,189,159 B1 | 1/2019 | Wilson et al. |
| 2014/0371762 A1 | 12/2014 | Farritor et al. |

(Continued)

FOREIGN PATENT DOCUMENTS

| EP | 3366107 A1 | 8/2018 |
| JP | 2017-177293 A | 10/2017 |
| JP | 2018-134059 A | 8/2018 |

OTHER PUBLICATIONS

Office Action issued in Japanese Patent Application No. 2022-501865 dated Jun. 20, 2023 (10 pages).

(Continued)

*Primary Examiner* — Dalena Tran
(74) *Attorney, Agent, or Firm* — Nakanishi IP Associates, LLC

(57) ABSTRACT

An object of the present invention is to simplify a joint, such as reducing the weight of the joint, in a robot arm mechanism capable of detecting contact of a person or an object. A robot arm mechanism (1) according to an embodiment of the present disclosure includes rotational joints (J1, J2). The rotational joint (J1) and the rotational joint (J2) are connected to each other by a link (30). The link (30) includes a plurality of link portions (31, 33, 35, 37). The link portions (31, 33) are coupled to each other via a torque sensor (61), the link portions (33, 35) are coupled to each other via a torque sensor (63), and the link portions (35, 37) are coupled to each other via a torque sensor (65).

6 Claims, 4 Drawing Sheets

(51) Int. Cl.
*B25J 9/16* (2006.01)
*B25J 13/08* (2006.01)
*B25J 19/06* (2006.01)

(56) References Cited

U.S. PATENT DOCUMENTS

| | | |
|---|---|---|
| 2017/0285625 A1 | 10/2017 | Sato et al. |
| 2018/0161115 A1 | 6/2018 | Farritor et al. |
| 2018/0215054 A1 | 8/2018 | Brudniok |
| 2019/0329901 A1* | 10/2019 | Cravener ................ B64C 27/39 |
| 2020/0214779 A1* | 7/2020 | Masuda ................ G05B 19/056 |
| 2021/0155286 A1* | 5/2021 | Yang .................... B62D 5/0415 |

OTHER PUBLICATIONS

International Search Report issued in PCT/JP2021/005450 mailed on Apr. 20, 2021 with English Translation (6 pages).
Written Opinion of International Searching Authority issued in PCT/JP2021/005450 mailed on Apr. 20, 2021 with English Translation (7 pages).

\* cited by examiner

ROBOT ARM MECHANISM

FIELD

Embodiments described herein relate generally to a robot arm mechanism.

BACKGROUND

With the decrease in the working population, use of collaborative robots that can work together with people in the same space is growing. Collaborative robots are required to stop safely when the robot comes into contact with a person or an object. As one of the methods for detecting contact of a person or an object with a robot, a method using a torque sensor is disclosed (for example, Patent Literature 1). In a method using a torque sensor, a torque sensor is arranged, for example, in a joint of a robot. When the output value of the torque sensor exceeds a predetermined reference value, it can be determined that "the robot has come into contact with a person or an object", and this can be used as a trigger to take measures such as stopping the robot.

CITATION LIST

Patent Literature

Patent Literature 1: Japanese Unexamined Patent Application Publication No. 2018-134059

SUMMARY OF INVENTION

Technical Problem

When a joint on the tip side of a robot, in particular, is equipped with a torque sensor, the weight of the tip portion of the robot increases, and the weight load on the base side of the robot increases. In order to cope with the increase in weight, it is necessary to use expensive parts with high rigidity. Further, in the joint, parts such as a motor and a reduction gear are housed, and wiring, etc. of electric cables connected to these electric parts is carried out; therefore, equipping the joint with a torque sensor not only makes the joint larger, but also complicates the structure inside the joint. Thus, it is desired to simplify the structure of the joint, such as reducing the weight of the joint, in a robot arm mechanism capable of detecting contact of a person or an object.

Solution to Problem

A robot arm mechanism according to an aspect of the present disclosure comprises a rotational joint, a link connected to the rotational joint, and a plurality of torque sensors. The link includes a plurality of link portions. The link portions are coupled to each other via torque sensors.

According to this aspect, a joint can be simplified (reduced in weight) in a robot arm mechanism capable of detecting contact with a person or an object.

DETAILED DESCRIPTION

Figure 1:
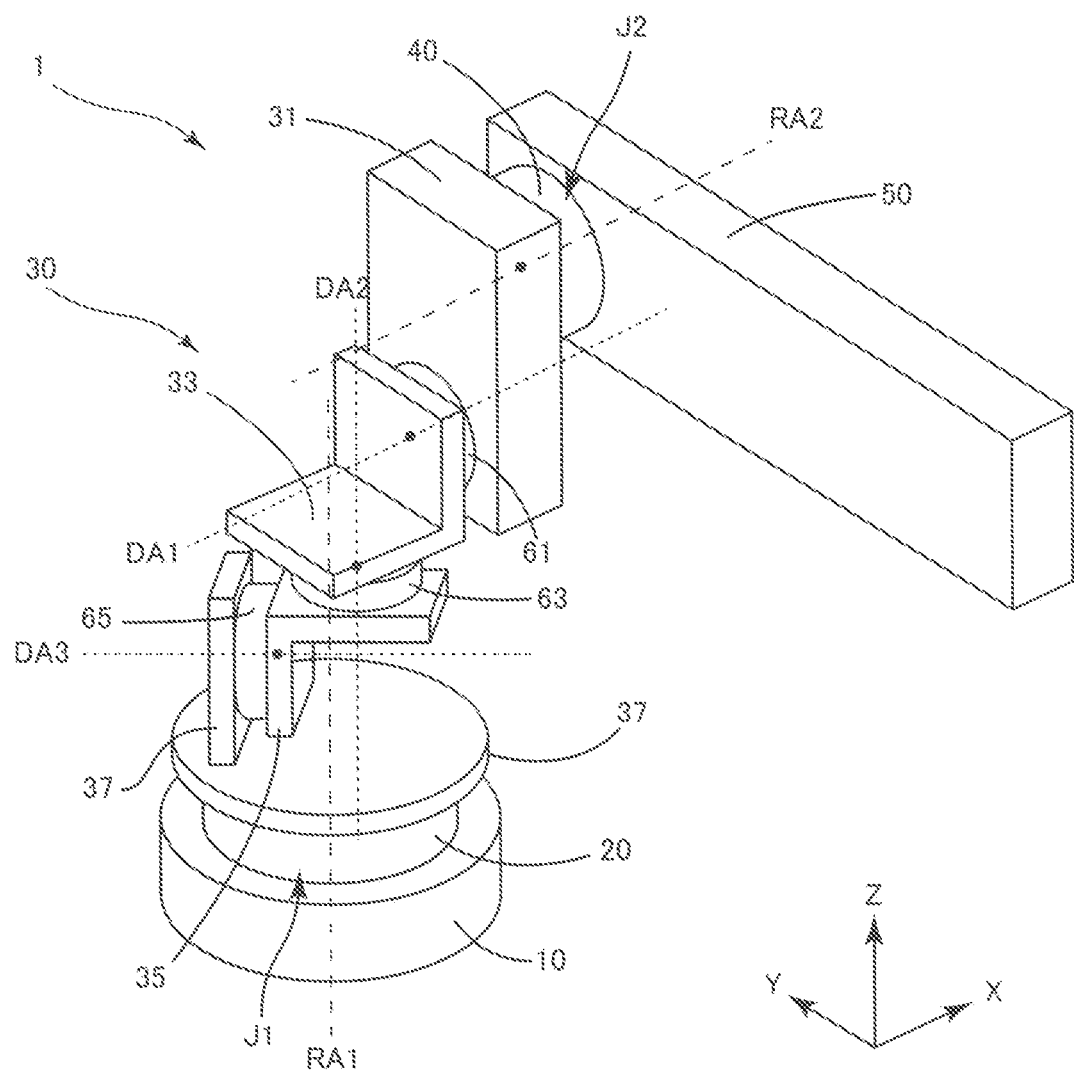
FIG. 1 is a perspective view of a robot arm mechanism according to an embodiment.

Hereinafter, the robot arm mechanism according to the present embodiment will be described with reference to the drawings. In the following description, components having substantially the same function and configuration are denoted by the same reference numeral, and a repetitive description will be given only where necessary.

Figure 2:
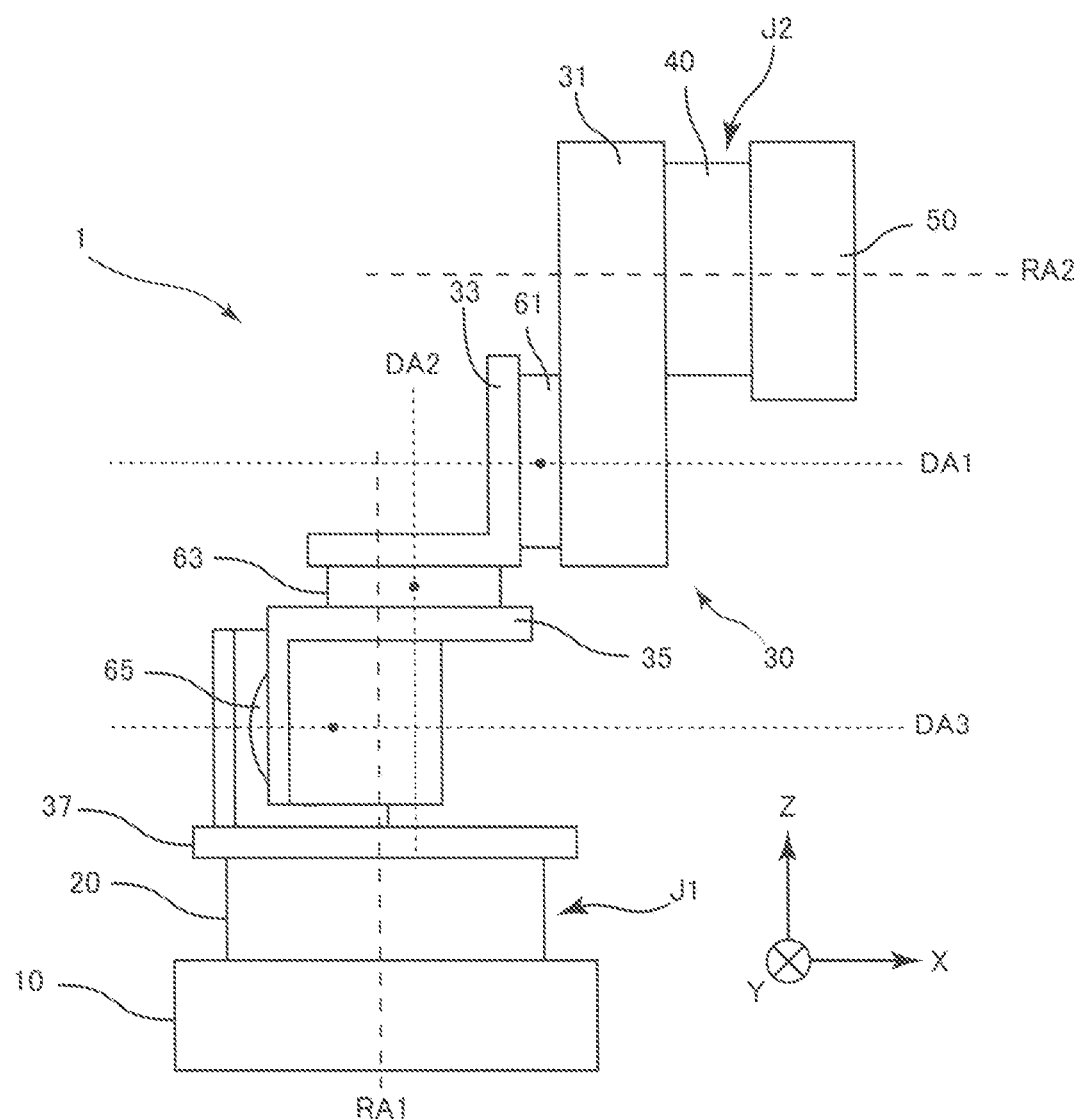
FIG. 2 is a front view of the robot arm mechanism of FIG. 1.
Figure 3:
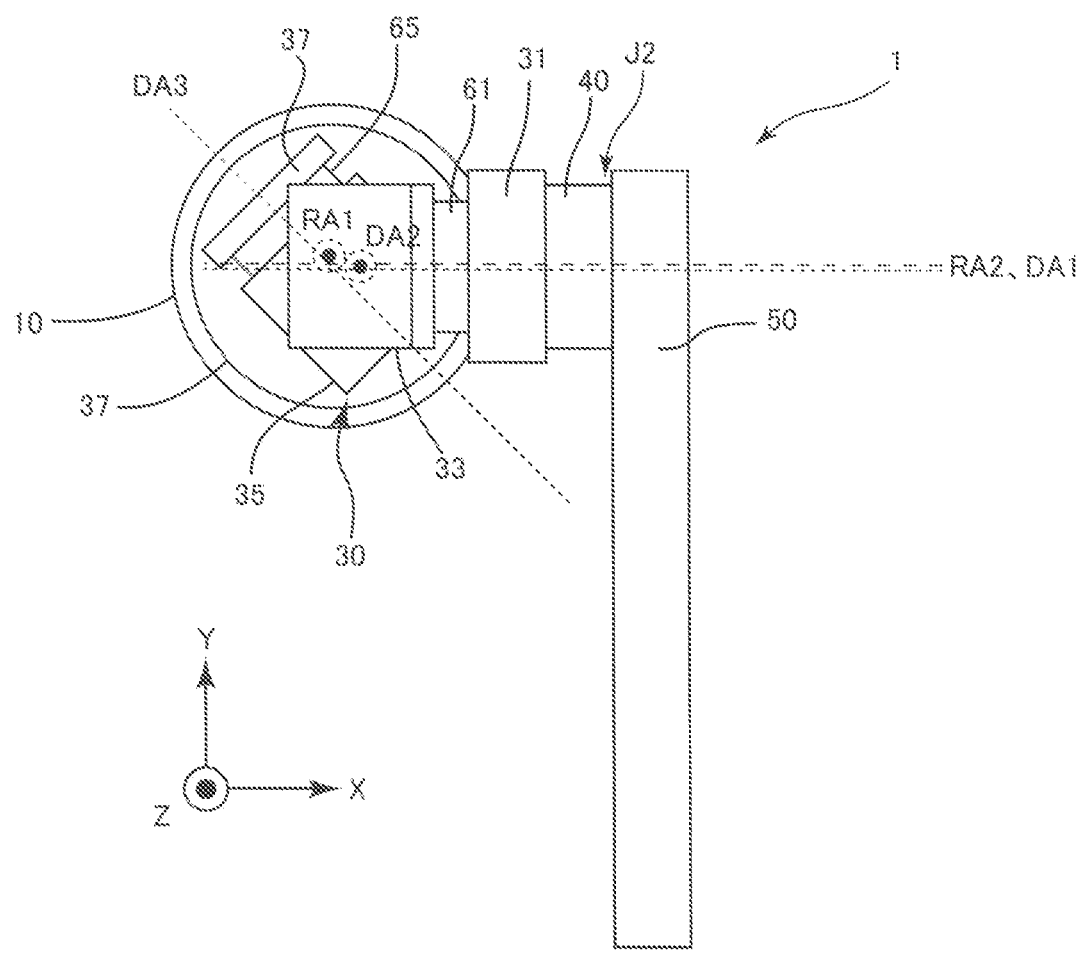
FIG. 3 is a plan view of the robot arm mechanism of FIG. 1.

FIGS. 1, 2, and 3 show a reference posture of a robot arm mechanism 1 according to the present embodiment. As shown in FIGS. 1, 2, and 3, the robot arm mechanism 1 according to the present embodiment includes a base 10 placed on a ground surface such as a floor surface. A link 30 is connected to the base 10 via a first rotational joint J1 having a first rotation axis RA1 perpendicular to the ground plane. Specifically, the base 10 is connected to the fixed side of a first reduction gear 20 driven by a first motor (not shown), and one end of the link 30 is connected to the rotating side of the first reduction gear 20. By the first reduction gear 20 being driven by the first motor, an arm 50 is rotated around the first rotation axis RA1 together with the link 30 with respect to the base 10. The arm 50 is connected to the link 30 via a second rotational joint J2 having a second rotation axis RA2 perpendicular to the first rotation axis RA1. Specifically, the other end of the link 30 is connected to the fixed side of a second reduction gear 40 driven by a second motor (not shown), and one end of the arm 50 is connected to the rotating side of the second reduction gear 40. By the second reduction gear 40 being driven by the second motor, the arm 50 is rotated around the second rotation axis RA2 with respect to the link 30.

In the following description, an axis parallel to the first rotation axis RA1 of the robot arm mechanism 1 is referred to as a Z-axis, an axis parallel to the second rotation axis RA2 of the robot arm mechanism 1 in the reference posture is referred to as an X-axis, and an axis orthogonal to the first rotation axis RA1 and the second rotation axis RA2 is referred to as a Y-axis, as appropriate.

In the robot arm mechanism 1 according to the present embodiment, a plurality of torque sensors are provided in the link 30 between the first rotational joint J1 closest to the base 10 and the second rotational joint J2 adjacent to the first rotational joint J1. Here, the link 30 includes four link portions 31, 33, 35, 37, and three torque sensors 61, 63, 65 are distributed in this link 30. The four link portions 31, 33, 35, 37 are referred to as a first link portion 31, a second link portion 33, a third link portion 35, and a fourth link portion 37 in order from the side far from the base 10, i.e., the side close to the tip of the robot arm mechanism 1. The three torque sensors 61, 63, 65 are referred to as a first torque sensor 61, a second torque sensor 63, and a third torque sensor 65 in order from the side far from the base 10.

Each torque sensor used here has a thin cylindrical shape and detects a torque around its cylinder central axis (hereinafter referred to as a detection axis). The torque sensor cannot detect force components that perpendicularly intersect the detection axis or force components in the direction along the detection axis. The torque sensor is provided between two members, and outputs a torque value corresponding to an angle by which one member is twisted around the detection axis with respect to the other member. Comparison of this torque value with a predetermined threshold value enables detection of a twist. As a method for detecting a torque, a known method such as a capacitance type or a strain gauge type can be adopted.

One feature of the robot arm mechanism 1 according to the present embodiment is that the torque sensors 61, 63, 65 are provided in the link 30 between the first rotational joint J1 and the second rotational joint J2. In comparison with the case where a torque sensor is housed in the second rotational joint J2, the degree of freedom in arrangement of the parts housed in the second rotational joint J2, such as a motor for driving the second rotational joint J2 and a reduction gear, can be improved, and reduction in parts costs, reduction in manufacturing costs, and reduction in wiring defects due to easier wiring can be expected. Further, since it is not necessary to house a torque sensor in the second rotational joint J2, the second rotational joint J2 itself can be reduced in size and weight, and parts closer to the base than the second rotational joint J2 can be expected to be replaced with parts having lower rigidity.

In addition, by providing the torque sensors 61, 63, 65 in the link 30, the torque sensors can be sealed with a simpler structure than when the torque sensors are housed in the second rotational joint J2 or the like because the link 30 itself does not move even when the first rotational joint J1 and the second rotational joint J2 are driven, which contributes to improved sealing performance, cost reduction, and the like.

Further, by providing the torque sensors 61, 63, 65 in the link 30 connected to the first rotational joint J1 closest to the base 10, the distance from the tip of the arm 50, which is a place where mainly a person or an object frequently comes into contact, to each torque sensor 61, 63, 65, which is the source of torque detection, can be increased. Accordingly, even if the external force applied to the tip of the arm 50 is small, the moment of force applied to each torque sensor 61, 63, 65 can be increased because of the long distance from the tip of the arm 50 to the torque sensor 61, 63, 65. That is, the sensitivity of each torque sensor 61, 63, 65 can be increased, and even a small contact such as a slight touch on the tip of the arm 50 can be detected by the torque sensor 61, 63, 65, which contributes to improvement of safety.

These effects described above do not depend on the number of torque sensors provided in the link, and the same effects can be obtained with one torque sensor or three or more sensors in the link.

In the present embodiment, a robot arm mechanism 1 having two rotational joints has been described as an example, but the effects are even greater when the present embodiment is applied to a robot arm mechanism having a number of axes such as four axes, five axes, or six axes. For example, in a robot arm mechanism having six joints, a torque sensor is installed in a link between a first joint closest to a base and a second joint adjacent to the first joint among a plurality of links By providing the torque sensor in a link on the side close to the base 10, in this case, in the link between the first joint and the second joint, the second joint, the third joint, the fourth joint, the fifth joint, and the sixth joint which are closer to the tip of the robot arm mechanism than that link can be reduced in size and weight. Since the joints on the tip side of the robot arm mechanism can be reduced in weight, the rigidity required for each part such as a link can be reduced, and the parts costs can be reduced. Of course, by arranging a torque sensor as described above, the distance from the tip of the arm to the torque sensor can be increased, and the sensitivity to detect contact with the arm can be improved. In the robot arm mechanism having six joints, a torque sensor may be installed in a link between a base and a first joint closest to the base.

Figure 4:
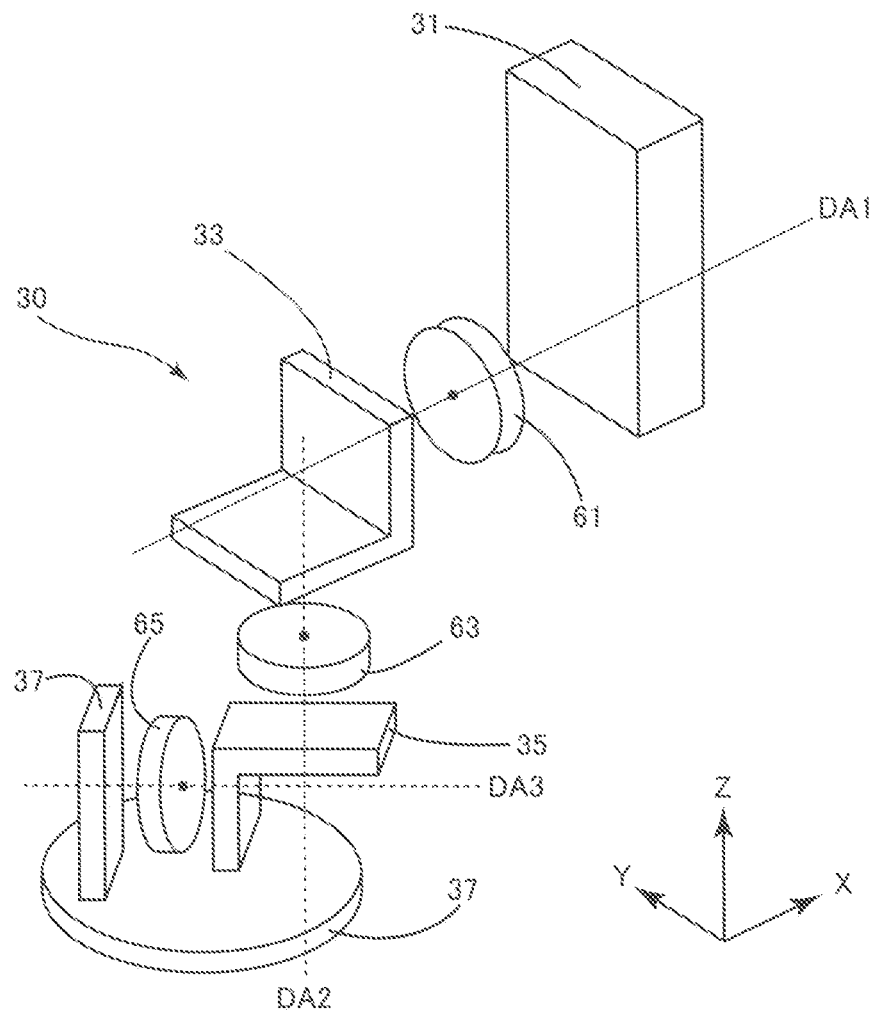
FIG. 4 is an exploded perspective view of a link of FIG. 1.

The arrangement configuration of the three torque sensors 61, 63, 65 provided in the link 30 will be described with reference to FIG. 4. As shown in FIG. 4, an end of the fourth link portion 37, which corresponds to one end of the link 30, is connected to a rotating portion of the first rotational joint J1 (first reduction gear 20), and an end of the first link portion 31, which corresponds to the other end of the link 30, is connected to a fixed portion of the second rotational joint J2 (second reduction gear 40).

The first link portion 31 is coupled to the second link portion 33 via the first torque sensor 61. The first torque sensor 61 is arranged such that its first detection axis DA1 is parallel to the second rotation axis RA2. The first torque sensor 61 outputs a torque value corresponding to an angle by which the first link portion 31 is twisted around the first detection axis DA1 with respect to the second link portion 33.

The second link portion 33 is coupled to the third link portion 35 via the second torque sensor 63. The second torque sensor 63 is arranged such that its second detection axis DA2 is parallel to the first rotation axis RA1. The second torque sensor 63 outputs a torque value corresponding to an angle by which the second link portion 33 is twisted around the second detection axis DA2 with respect to the third link portion 35.

The third link portion 35 is coupled to the fourth link portion 37 via the third torque sensor 65. The third torque sensor 65 is arranged such that its third detection axis DA3 is parallel to a plane (XY plane) perpendicular to the first rotation axis RA1 and is inclined at an angle of less than 90 degrees with respect to the second rotation axis RA2. To explain the positional relationship between the detection axes, the third torque sensor 65 is arranged such that its third detection axis DA3 is perpendicular to the second detection axis DA2 and the third detection axis DA3 is inclined at an angle of less than 90 degrees with respect to the first detection axis DA1. The third torque sensor 65 outputs a torque value corresponding to an angle by which the third link portion 35 is twisted around the third detection axis DA3 with respect to the fourth link portion 37.

By arranging the torque sensors 61, 63, 65 such that the detection axes have the above-described positional relationship, the first detection axis DA1 and the second detection axis DA2 can be made parallel to two axes (X-axis and Z-axis) of the three orthogonal axes, respectively, and the third detection axis DA3 can be inclined at an angle of less than 90 degrees with respect to the remaining one axis (Y-axis) of the three orthogonal axes. In this way, by arranging the first torque sensor 61, the second torque sensor 63, and the third torque sensor 65 such that the first detection axis DA1, the second detection axis DA2, and the third detection axis DA3 are not parallel to each other, that is, by arranging them in a twisted or intersecting positional relationship, the first torque sensor 61, the second torque sensor 63, and the third torque sensor 65 can detect torques around different axes, and can expand the range and direction in which contact of a person or an object with the robot arm mechanism 1, particularly the arm 50, can be detected.

Further, by arranging the first torque sensor 61 and the second torque sensor 63 such that the first detection axis DA1 is perpendicular to the second detection axis DA2, the direction of the torque detectable by the first torque sensor 61 and the direction of the torque detectable by the second torque sensor 63 can be made orthogonal to each other. This allows the range and direction in which contact with the arm 50 or the like can be detected to be expanded, thereby improving the safety of the robot arm mechanism 1.

The possibility that a person or an object unintentionally comes into contact with the arm 50 or the like is higher when the robot arm mechanism 1 is in operation than when the robot arm mechanism 1 is stationary. By arranging the first torque sensor 61 such that the first detection axis DA1 is parallel to the second rotation axis RA2 of the second rotational joint J2 as in the present embodiment, the first torque sensor 61 can detect contact with the arm 50 or the like during the rotational operation around the second rotation axis RA2 with high sensitivity. Similarly, by arranging the second torque sensor 63 such that the second detection axis DA2 is parallel to the first rotation axis RA1 of the first rotational joint J1, the second torque sensor 63 can detect contact with the arm 50 or the like during the rotational operation around the first rotation axis RA1 with high sensitivity. These contribute to improvement of the safety of the robot arm mechanism 1.

It is also one feature that, in the present embodiment, the first torque sensor 61 and the second torque sensor 63 are arranged such that the first detection axis DA1 and the second detection axis DA2 are parallel to two axes (X-axis and Z-axis) of the three orthogonal axes, respectively, and the third torque sensor 65 is arranged such that the third detection axis DA3 is not parallel to the remaining one axis (Y-axis) of the three orthogonal axes. As in the present embodiment, by arranging the third torque sensor 65 such that the third detection axis DA3 is perpendicular to the second detection axis DA2 and is inclined at an angle of less than 90 degrees with respect to the first detection axis DA1, the third torque sensor 65 can detect not only the torque around the Y-axis, which cannot be detected by the first torque sensor 61 or the second torque sensor 63, but also the torque around the X-axis. That is, the torques around the three orthogonal axes can be detected by the three torque sensors 61, 63, 65, and the torque around the X-axis can be detected by both the first torque sensor 61 and the third torque sensor 65. Instead of arranging three torque sensors such that the detection axes are parallel to the three orthogonal axes, respectively, one of the torque sensors is arranged such that the detection axis is inclined at an angle of less than 90 degrees with respect to another detection axis, thereby enabling two torque sensors to detect the torque around one specific axis while enabling detection of the torques around the three orthogonal axes. For example, the contact detection accuracy can be improved by setting the axis of the torque detected by two torque sensors to the axis with high torque detection frequency, i.e., high contact frequency.

It should be noted that the above description does not deny that the three torque sensors 61, 63, 65 are arranged such that their detection axes are parallel to the three orthogonal axes, respectively. In addition, if two torque sensors are provided instead of three, they may be provided such that the detection axes of the two torque sensors are not parallel to each other, for example, orthogonal to each other. When four or more sensors are provided, they may be provided such that the detection axes of three torque sensors are parallel to the three orthogonal axes, respectively, and the detection axis of the remaining one torque sensor is not parallel to the other three detection axes.

While some embodiments have been described, these embodiments have been presented as examples, and are not intended to limit the scope of the invention. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

The invention claimed is:

1. A robot arm mechanism comprising:
a base;
a plurality of links arranged on the base;
a rotational joint connecting the plurality of links; and
a plurality of torque sensors, wherein
all of the plurality of torque sensors are attached together to one of the plurality of links, and,
among the plurality of the links, the one of the plurality of links is located closest to the base.

2. The robot arm mechanism according to claim 1, wherein the torque sensors are arranged such that a plurality of detection axes are in a twisted or intersecting positional relationship.

3. The robot arm mechanism according to claim 2, wherein a first torque sensor of the torque sensors is arranged such that the detection axis is perpendicular to the detection axis of the second torque sensor.

4. The robot arm mechanism according to claim 3, wherein a third torque sensor of the torque sensors is arranged such that the detection axis is inclined at an angle of less than 90 degrees with respect to the detection axis of the first torque sensor.

5. The robot arm mechanism according to claim 4, wherein the third torque sensor is arranged such that the detection axis is perpendicular to the detection axis of the second torque sensor.

6. The robot arm mechanism according to claim 3, wherein the first torque sensor and the second torque sensor are arranged such that the detection axes are respectively parallel to rotation axes of two rotational joints connected to both sides of the at least one link.

* * * * *